US010832211B2

(12) United States Patent
Herbert, III et al.

(10) Patent No.: US 10,832,211 B2
(45) Date of Patent: Nov. 10, 2020

(54) OPENING AN ATTACHMENT AND CONVERSATION FROM A MESSAGING APPLICATION

(71) Applicant: Microsoft Technology Licensing, LLC, Redmond, WA (US)

(72) Inventors: George Arthur Herbert, III, Woodinville, WA (US); Elena Catrinescu, Woodinville, WA (US); Darren Alexander Apfel, Redmond, WA (US); Alexander William Darrow, Seattle, WA (US); Rebecca Jean Lawler, Seattle, WA (US); Philip Z. Loh, Seattle, WA (US); Joseph Patrick Masterson, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 182 days.

(21) Appl. No.: 15/444,250

(22) Filed: Feb. 27, 2017

(65) Prior Publication Data

US 2018/0248822 A1    Aug. 30, 2018

(51) Int. Cl.
*G06Q 10/10*      (2012.01)
*H04L 12/58*      (2006.01)
(Continued)

(52) U.S. Cl.
CPC ........... *G06Q 10/10* (2013.01); *G06F 3/0482* (2013.01); *G06F 3/04886* (2013.01);
(Continued)

(58) Field of Classification Search
CPC ......... H04L 51/08; H04L 51/04; H04L 51/22; H04L 51/34; G06F 3/0482;
(Continued)

(56) References Cited

U.S. PATENT DOCUMENTS 6,405,225 B1 *   6/2002   Apfel ..................... G06F 17/24
                                                        709/206
7,243,298 B2     7/2007   Yozell-Epstein et al.
(Continued)

FOREIGN PATENT DOCUMENTS

CN      103188128 A    7/2013
EP      2565831 A1     3/2013

OTHER PUBLICATIONS

"See files others have shared with you", Retrieved from <<https://support.office.com/en-us/article/See-files-others-have-shared-with-you-e0476dc7-bf2f-4203-b9ad-c809578b03e7>>, Dec. 2, 2016, 4 Pages.

(Continued)

*Primary Examiner* — Kieu D Vu
*Assistant Examiner* — Rami R Okasha
(74) *Attorney, Agent, or Firm* — Merchant & Gould

(57) ABSTRACT

Extraction and provision of message identification information to a productivity application for enabling the productivity application to provide an embedded communication experience in association with an attachment file is provided. A message including an attachment is received via a messaging application. Upon receiving a selection to open the attachment from within the messaging application, the attachment file is opened in a productivity application, and various parameters associated with the message are extracted. A path including the various parameters is constructed and passed to a productivity application, thus allowing the productivity application to provide a persisted conversation in a user interface of the productivity application for viewing of and interaction with the conversation.

20 Claims, 9 Drawing Sheets

US 10,832,211 B2

Page 2

(51) Int. Cl.
*G06F 3/0482* (2013.01)
*G06F 3/0488* (2013.01)

(52) U.S. Cl.
CPC ......... *G06Q 10/103* (2013.01); *G06Q 10/107* (2013.01); *H04L 51/08* (2013.01); *H04L 51/22* (2013.01); *H04L 51/34* (2013.01); *H04L 51/04* (2013.01)

(58) Field of Classification Search
CPC .. G06F 3/04886; G06Q 10/10; G06Q 10/103; G06Q 10/107
See application file for complete search history.

(56) References Cited

U.S. PATENT DOCUMENTS

| | | | | |
|---|---|---|---|---|
| 7,818,678 | B2* | 10/2010 | Massand | G06F 17/2229 715/751 |
| 7,865,815 | B2* | 1/2011 | Albornoz | G06F 3/0483 715/229 |
| 8,185,591 | B1 | 5/2012 | Lewis | |
| 8,341,235 | B2 | 12/2012 | Kumar | |
| 8,775,520 | B1 | 7/2014 | Lewis et al. | |
| 8,826,148 | B2 | 9/2014 | Yuniardi et al. | |
| 8,972,495 | B1* | 3/2015 | Borna | H04L 51/08 709/204 |
| 9,298,783 | B2 | 3/2016 | Brezina et al. | |
| 9,300,609 | B1* | 3/2016 | Beausoleil | G06F 16/248 |
| 9,342,820 | B2 | 5/2016 | Vidalenc et al. | |
| 9,384,470 | B2 | 7/2016 | Lemay et al. | |
| 2002/0065849 | A1* | 5/2002 | Ferguson | H04L 29/06 715/205 |
| 2002/0183044 | A1* | 12/2002 | Blackwell | G06Q 10/107 455/412.1 |
| 2004/0267871 | A1* | 12/2004 | Pratley | G06Q 10/10 709/200 |
| 2006/0069990 | A1* | 3/2006 | Yozell-Epstein | G06Q 10/107 715/273 |
| 2006/0075046 | A1* | 4/2006 | Yozell-Epstein | G06Q 10/107 709/206 |
| 2006/0123347 | A1 | 6/2006 | Hewitt et al. | |
| 2007/0011258 | A1* | 1/2007 | Khoo | G06F 3/0482 709/206 |
| 2007/0233791 | A1 | 10/2007 | Sylthe et al. | |
| 2008/0046518 | A1* | 2/2008 | Tonnison | G06Q 10/107 709/206 |
| 2008/0120360 | A1 | 5/2008 | Dumitru et al. | |
| 2009/0030872 | A1 | 1/2009 | Brezina et al. | |
| 2009/0063648 | A1* | 3/2009 | Malik | H04L 51/14 709/206 |
| 2009/0177754 | A1 | 7/2009 | Brezina et al. | |
| 2009/0319618 | A1 | 12/2009 | Affronti et al. | |
| 2010/0005398 | A1* | 1/2010 | Pratley | G06Q 10/10 715/751 |
| 2010/0017404 | A1* | 1/2010 | Banerjee | G06F 15/16 707/E17.014 |
| 2010/0115401 | A1* | 5/2010 | Nordine | G06F 17/24 715/255 |
| 2011/0252098 | A1* | 10/2011 | Kumar | G06Q 10/107 709/206 |
| 2012/0192055 | A1* | 7/2012 | Antebi | G06F 17/2288 715/229 |
| 2012/0278402 | A1 | 11/2012 | Limont et al. | |
| 2012/0284618 | A1* | 11/2012 | Bailor | G06F 17/241 715/255 |
| 2012/0284639 | A1* | 11/2012 | Yuniardi | G06Q 10/00 715/752 |
| 2015/0169599 | A1 | 6/2015 | Burnett et al. | |
| 2015/0193100 | A1* | 7/2015 | Strode | G06F 3/0484 715/765 |
| 2015/0200885 | A1* | 7/2015 | Sharp | H04L 51/08 709/206 |
| 2015/0269242 | A1 | 9/2015 | Dey et al. | |
| 2015/0277724 | A1* | 10/2015 | Masterson | G06F 16/22 715/753 |
| 2015/0277725 | A1* | 10/2015 | Masterson | G06F 3/04847 715/753 |
| 2015/0281148 | A1* | 10/2015 | Masterson | H04L 51/08 715/752 |
| 2015/0281149 | A1* | 10/2015 | Masterson | H04L 51/08 715/752 |
| 2015/0281150 | A1* | 10/2015 | Masterson | G06F 16/22 715/752 |
| 2015/0347368 | A1* | 12/2015 | Carlen | H04L 51/08 715/230 |
| 2016/0283051 | A1* | 9/2016 | Masterson | G06F 3/0482 |
| 2017/0078343 | A1* | 3/2017 | Qiu | H04L 67/2804 |
| 2017/0206545 | A1* | 7/2017 | Gupta | G06Q 30/0226 |

OTHER PUBLICATIONS

"Slack for Collaboration", Retrieved from <<http://www.macdrifter.com/2014/02/slack-for-collaboration.html>>, Feb. 20, 2014, 15 Pages.

"Your Documents Online, Any Device, Anywhere", Retrieved from <<https://quip.com/features/documents>>, Dec. 5, 2016, 6 Pages.

Chhatrapati, Dipti, "Microsoft Graph Api—A Single Stop for Your Cloud Solution", Retrieved from <<https://web.archive.org/web/20160320092050/http://sharepointrun.com/microsoft-graph-api-a-single-stop-for-your-cloud-solution/>>, Feb. 2, 2016, 12 Pages.

"International Search Report and Written Opinion Issued in PCT Application No. PCT/US2018/019070", dated Apr. 18, 2018, 13 Pages.

"International Search Report and Written Opinion Issued in PCT Application No. PCT/US2018/019071", dated Apr. 6, 2018, 12 Pages.

Tanme, et al., "Improving Email Management", In Proceedings of the first International Conference on Advances in Information Mining and Management, Oct. 23, 2011, pp. 67-72.

Perez, Sarah, "Gmail Users No Longer Need to Download Attachments, As Google Drive Gets Baked Into the Inbox", https://techcrunch.com/2013/11/12/gmail-users-no-longer-need-to-download-attachments-as-google-drive-gets-baked-into-the-inbox/, Published on: Nov. 12, 2013, 5 pages.

Mathe, Olof, "Feature Spotlight: Attachment Previews", https://mixmax.com/blog/feature-spotlight-attachment-previews, Retrieved on: Nov. 30, 2016, 5 pages.

"Non Final Office Action Issued in U.S. Appl. No. 15/444,222", dated Jun. 27, 2019, 19 Pages.

"Final Office Action Issued in U.S. Appl. No. 15/444,222", dated Jan. 10, 2020, 22 Pages.

* cited by examiner

MOBILE COMPUTING DEVICE

OPENING AN ATTACHMENT AND CONVERSATION FROM A MESSAGING APPLICATION

BACKGROUND

Electronic messages, such as emails, are commonly used for sharing files with other individuals. That is, a file can be attached to a message and delivered to an intended recipient. When an attachment file is opened from a messaging application, a respective productivity application launches the attachment file in a productivity application user interface. Currently, there is not an association between the attachment file and the message or conversation from which it came. The attachment file and the message or conversation are independently manipulated, and thus have no relationship when work is being done to them. For example, as the conversation changes (e.g., a new message in the conversation is received), the attachment file is unaware of the changes and thus shows no relationship to the changes in the productivity application user interface. Similarly, as changes to the attachment file are made (e.g., the file is saved or edited), the work is not related back to the conversation.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Systems, methods, and computer readable devices embodying instructions are provided herein for increased user interaction performance and/or improved computational efficiency by providing message identification information to a productivity application for enabling the productivity application to provide an embedded communication experience in association with an attachment file.

In particular, aspects are directed to receiving an electronic message including an attached file via a messaging application, caching the attached file, extracting various parameters from the electronic message, constructing a path including the various extracted parameters, and passing the path to a productivity application, thus allowing the productivity application to provide a persisted conversation in a user interface of the productivity application for viewing of and interaction with the conversation. Advantageously, aspects of the present disclosure enable the user to move freely between an attachment and associated messages, providing a seamless interaction between an attachment and associated messages. Accordingly, the user is enabled to have increased focused time within the attachment file and a conversation view in a single user interface, thus increasing user efficiency.

Examples are implemented as a computer process, a computing system, or as an article of manufacture such as a device, computer program product, or computer readable medium. According to an aspect, the computer program product is a computer storage medium readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIG. 3 illustrates an example messaging application user interface (UI) showing an attachment in a message being selectively opened;

FIG. 4A illustrates an example productivity application UI showing the attachment opened in a content viewing region in the productivity application UI;

DETAILED DESCRIPTION

Figure 1:
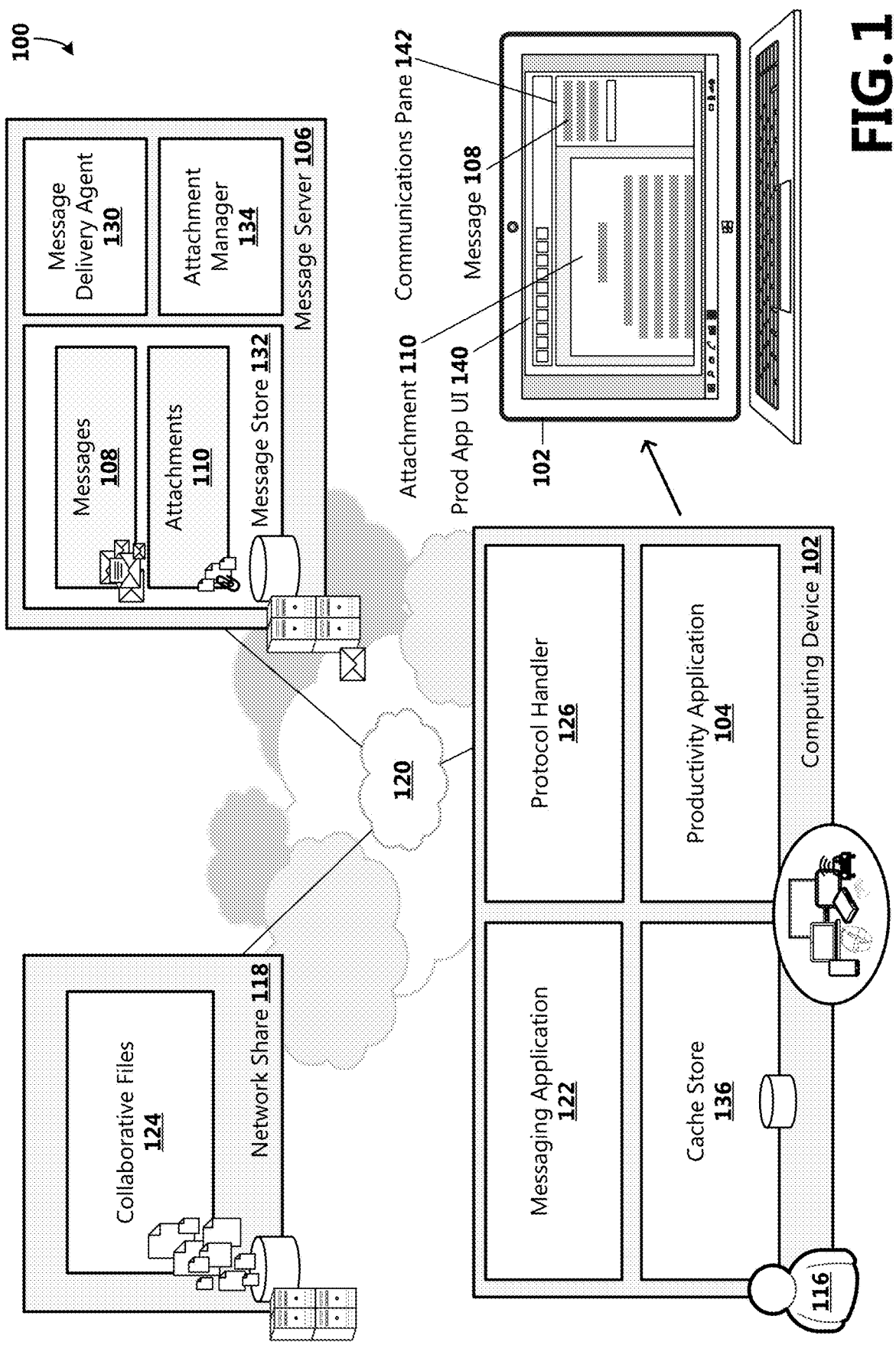
FIG. 1 is a block diagram of an example operating environment including an attachment access system for providing message identification information to a productivity application for enabling the productivity application to provide an embedded communication experience in association with an attachment file.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a system, method, and computer readable device embodying instructions for providing message identification information to a productivity application for enabling the productivity application to provide an embedded communication experience in association with an attachment file. With reference now to FIG. 1, a block diagram of one example operating environment 100 including a system for providing message identification information is shown. As illustrated, the example environment 100 includes a computing device 102. The computing device 102 may be one of various types of computing devices (e.g., a tablet computing device, a desktop computer, a mobile communication device, a laptop computer, a laptop/tablet hybrid computing device, a large screen multi-touch display, a gaming device, a smart television, a wearable device, or other type of computing device) for executing applications for performing a variety of tasks. The hardware of these computing devices is discussed in greater detail in regard to FIGS. 5, 6A, 6B, and 7.

According to examples, the computing device 102 is operative to execute one or more different types of messaging applications 122 to receive, view, interact with, compose, or generate electronic messages 108. For example, messaging applications 122 may include, without limitation, one or more of the following types of applications: an email application, an instant messaging (IM) application, a short messaging service (SMS) application, a multimedia messaging service (MMS) application, a real-time information network (e.g., an interface for the TWITTER® message service, offered by Twitter, Inc. of San Francisco, Calif.) application, a social networking application, and the like. The messaging application(s) 122 may be client based or web based. A message server 106 is operative to receive incoming electronic messages 108 from a sending user, and forward outgoing electronic messages 108 for delivery to a recipient user. An electronic message 108 is illustrative of an electronic message that is communicated between one or more users for passing text-based communications and a variety of attached files (i.e., attachments 110), for example, audio files, text files, image files, data files, and the like.

In some examples, an attachment 110 is a linked file, where the file is stored in a shared file repository (e.g., network share 118), and a link to the file is attached to the message 108. For example, the network share 118 is a shared resources server located at an enterprise accessible by various users, or remotely located from the various users at which the users may store and collaborate on various collaborative files 124 (e.g., documents, spreadsheet, images, video, web content, and the like). The network share 118 can be an enterprise-based storage service, or can be a third party cloud storage service that is supported by one or more applications (e.g., messaging application 122, productivity application(s) 104, file finder application 128) executed by the computing device 102.

In other examples, an attachment 110 is an embedded file, where the file is copied from its storage location (e.g., a repository local to the sender, a remote repository, a shared file repository, a third party cloud storage service repository) and is embedded in the message 108. Accordingly, an embedded attachment 110 is stored in a message store 132 (e.g., mailbox) of the message recipient. In some examples, the message server 106 is operative to transmit an electronic message 108 to one or more intended recipients by routing the electronic message 108 to one or more message delivery agents 130. The message server 106 includes or is communicatively attached to a plurality of message delivery agents 130, wherein each message delivery agent 130 is connected to a user's message store 132 (e.g., a mailbox) from which the messaging application 122 is operative to retrieve an electronic message 108. When an attachment 110 is included with the electronic message 108, the messaging application 122 is further operative to retrieve the associated attachment from message store 132. In some examples, the message store 132 is located on a remote device, such as the message server 106, and is accessible to the messaging application 122 over a network 120. In other examples, the message store 132 is located on the recipient user's computing device 102. When electronic messages 108 are received, the messages may be stored in a particular folder, such as in inbox folder or other folder based on user-specified settings. The user 116 can selectively view a listing of messages 108 in a particular folder or a listing of messages that meet entered search criteria in a messaging application UI. In some examples, a preview or reading pane is provided for displaying at least a portion of a selected message 108.

According to aspects, the computing device 102 is further operative to execute one or more different productivity applications 104 that allow a user 116 to interact with a variety of content files, for example, to produce information such as documents, presentations, worksheets, databases, charts, graphs, digital paintings or drawings, electronic music, and digital videos. Productivity applications 104 such as word processing applications, slide presentation application, spreadsheet applications, notes-taking applications, desktop publishing applications, drawing applications, image processing and editing applications, video applications, and the like may be operated at the computing device 102 by the user 116. The user 116 may utilize a productivity application 104 on the computing device 102 for a variety of tasks, which may include, for example, to write, calculate, draw, take and organize notes, organize and prepare presentations, browse web content, make music, and the like. In some examples, a productivity application 104 is a thick client application, which is stored locally on the computing device 102. In other examples, a productivity application 104 is a thin client application (i.e., web application) that resides on a remote server and is accessible over a network 120 or a combination of networks, such as the Internet or an intranet. A thin productivity application 104 may be hosted in a browser-controlled environment or coded in a browser-supported language and reliant on a common web browser to render the application executable on the computing device 102. In some examples, a productivity application 104 is a third-party application.

According to examples, a graphical user interface (GUI) 140 is provided by the productivity application 104 for enabling the user to interact with functionalities of the application and with file content through manipulation of graphical icons, visual indicators, and the like. According to an aspect and as will be described in greater detail below, the productivity application 104 is operative to provide a GUI 140 for displaying an attachment 110 and at least a portion of a message 108 associated with the attachment 110 in a single user interface. According to another aspect and as will also be described in greater detail below, the productivity application 104 is further operative to provide communication functionalities associated with a messaging application 122 in the GUI 140.

In some examples, a single message 108 is associated with an attachment 110. In other examples, a plurality of messages 108 are associated with an attachment 110. For example, a message 108 to which an attachment 110 is embedded may be part of a conversation comprised of a plurality of messages 108. According to an aspect, an attachment 110 of an electronic message 108 can be selectively opened in a productivity application 104 from the messaging application 122. For example, the user 116 can click on or utilize another input method for selecting an attachment 110. In response to the selection, the attachment 110 is stored in a cache store 136 on the user's computing device 102.

According to an aspect, the client messaging application 122 is configured to make an Application Programming Interface (API) call to the message server 106 to extract server communication information from the message server 106. For example, the messaging application 122 extracts communication base functionality information for opening messages 108 in combination with an attachment file. According to an aspect, the messaging application 122 is further operative to extract context information (e.g., a message identifier (ID)). For example, the messaging application 122 generates a message server-understood conversation identifier from a local message identifier, and extracts identity information for communication to the message server 106. Further, the messaging application 122 constructs a protocol network path reference or a protocol URL (Uniform Resource Locator) that includes the various parameters associated with the message(s) 108 or conversation. In an example, the protocol URL comprises a base URL, query string parameters, and the context information (e.g., message ID).

According to an aspect, the messaging application 122 utilizes a Shell script API to send the protocol network path reference to a protocol handler 126. For example, the protocol handler 126 is registered with the operating system, and is operative to handle associated application protocols (e.g., productivity applications 104). The protocol handler 126 enables additional context information (e.g., message ID) to be exposed to other applications, for example, to open the message(s) 108 or conversation and display the message (s) in a communications pane 142 in the productivity application UI 140.

In one example, the protocol handler 126 receives the protocol network path reference from the messaging application 122 via the Shell, for example, because of registration association information, and parses the protocol network path reference for various parameters. According to an aspect, the protocol handler 126 extracts the base parameters as a command line and appends additional command line flags context to the Shell string. Further, protocol handler 126 constructs a Shell execute command line with the extracted command line flags, and makes a call to the Shell to start the appropriate productivity application 104 based on the attachment 110 file type (e.g., a word processing document, a presentation, a worksheet, a digital painting or drawing, electronic music, digital video). In another example, the messaging application 122 passes the protocol network path reference to the productivity application 104 unencumbered, wherein parsing of the protocol network path reference is performed by the productivity application 104.

According to an aspect, the productivity application 104 is launched, extracts the command line parameters context (e.g., message ID), and stores the context in an attachment file-specific location (e.g., an attachment file will have an independent set of context). The productivity application 104 is further operative to load the attachment file and check for associated context. When context is stored in association with the attachment 110, the productivity application 104 is operative to use the protocol network path reference (e.g., the protocol URL) and context to establish a communication to the message server 106 where the message(s) 108 or conversation associated with the attachment 110 reside. Further, the productivity application 104 obtains message data from the message server 106, and extracts out relevant content for rendering in a communications panel 142 in the productivity application UI 140, where the message(s) associated with an attachment 110 are displayed. According to an aspect, a functional optimized messaging application 122 user experience is loaded into the communications panel 142, where the message(s) 108 or conversation associated with the attachment 110 is displayed.

According to an aspect, the message(s) 108 or conversation continues to persist in the communications panel 142 as the user 116 interacts with the attachment 110. For example, various functionalities are provided by the productivity application 104 for allowing the user 116 to edit the attachment file in association with the provided functionality. Some functionalities are tools and settings related to authoring content, and can be activated via various methods. In one example, various selectable functionality controls associated with productivity application tools and settings are arranged in a toolbar provided by the productivity application 104.

According to another aspect, various messaging application functionalities are provided in the communications panel 142. In some examples, a limited or lightweight set of messaging application functionalities are provided, such as a functionality command for adding a message 108 to a displayed conversation. According to an aspect, when an edit is made to the attachment 110 and a selection is made by the user 116 to add a message 108 (e.g., email, SMS, MMS, instant message, post) or reply to the message or conversation associated with the attachment, the edited file is automatically attached to the message 108 and delivered with the message 108 to the recipient(s).

In other examples, an expand option is provided in the communications panel 142 that enables launching out of the limited conversation experience provided via the productivity application 104 to a more in-depth communication experience via a messaging application 122. For example, the user 116 may want to reply via a meeting request, modify recipients, modify message properties, and the like. According to an aspect, when a selection of the expand option is made, the productivity application 104 communicates with the messaging application 122 for instructing the messaging application 122 to launch. Further, the productivity application 104 communicates instructions to the messaging application 122 to open the currently displayed message 108 in the messaging application UI. Advantageously, the user 116 is enabled to stay in context with the conversation experience provided via the productivity application 104.

Figure 2:
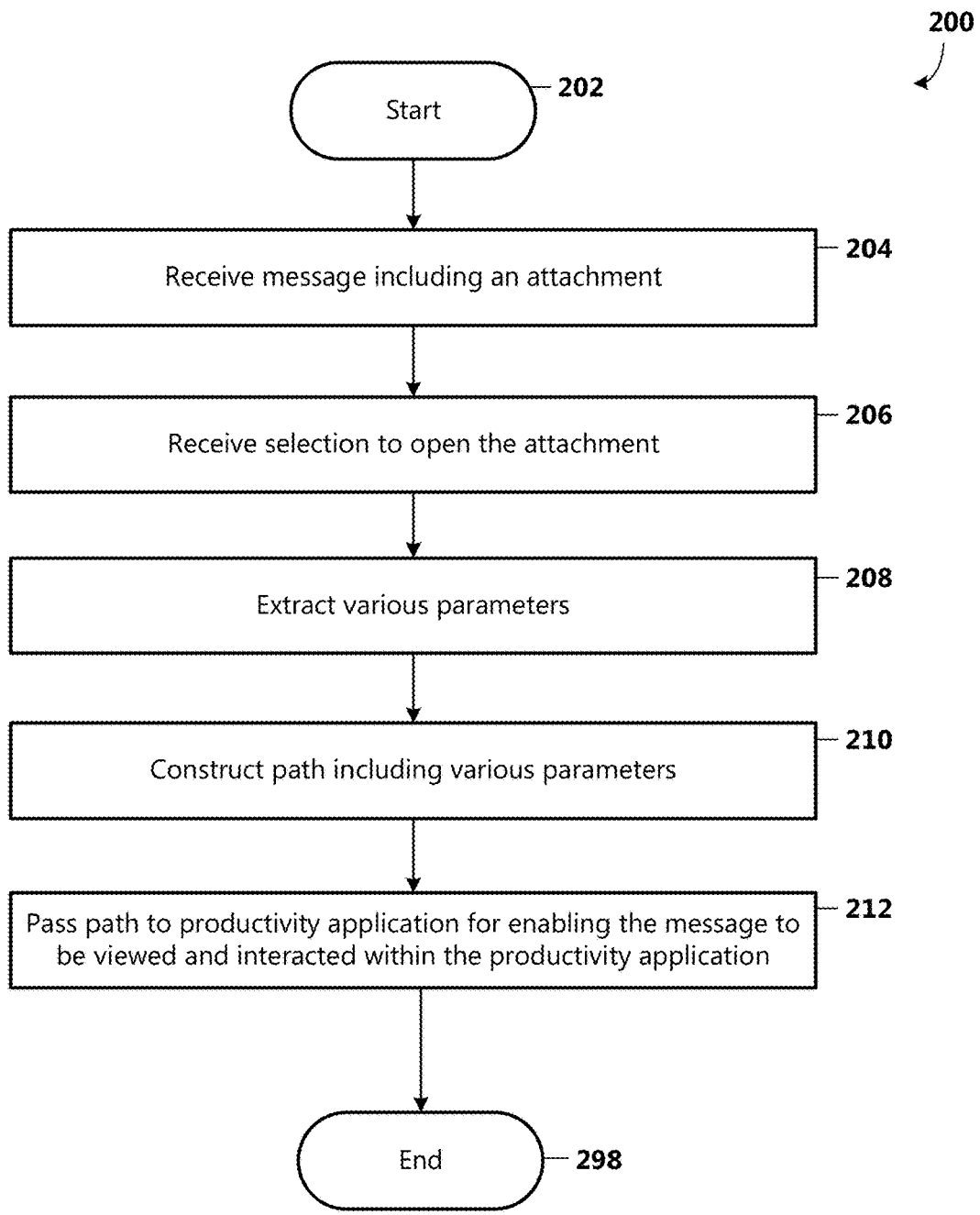
FIG. 2 shows a flow chart showing general stages involved in an example method for providing message identification information to a productivity application for enabling the productivity application to provide an embedded communication experience in association with an attachment file.
Figure 3:
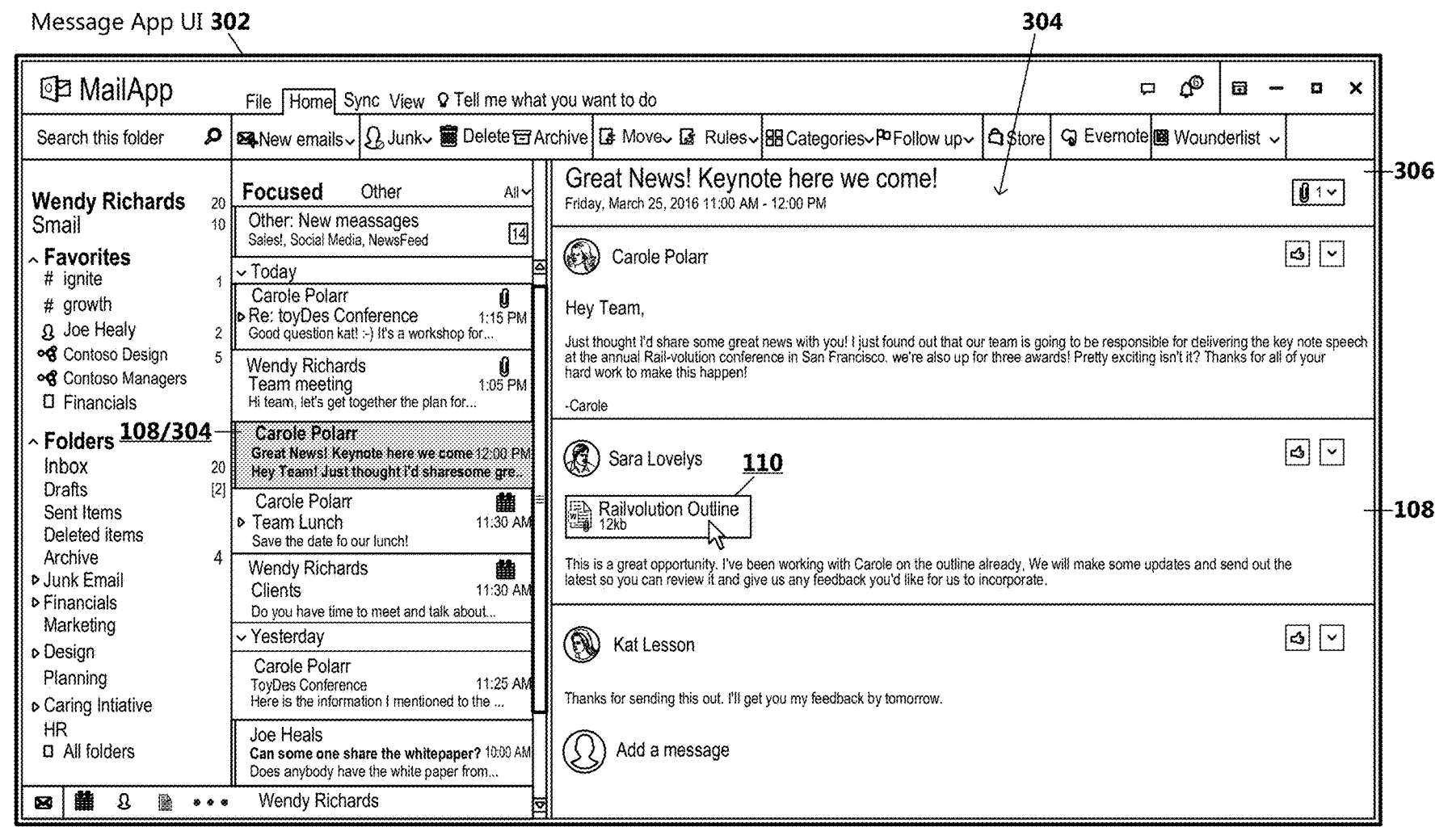

FIG. 2 shows a flow chart showing general stages involved in an example method 200 for providing message identification information to a productivity application 104 for enabling the productivity application 104 to provide an embedded communication experience in association with an attachment file. The method 200 will be described with reference to example UI illustrations in FIGS. 3, 4A, and 4B. With reference now to FIG. 2, the method 200 begins at START OPERATION 202, and proceeds to OPERATION 204, where an electronic message 108 comprising an attachment 110 is received via a messaging application 122, such as an email application, an instant messaging (IM) application, a short messaging service (SMS) application, a multimedia messaging service (MMS) application, a real-time information network (e.g. an interface for the TWITTER® message service) application, a social networking application, and the like.

The method 200 proceeds to OPERATION 206, where a selection to open the attachment 110 is received. For example, the message 108 that the attachment 110 is attached to or another message 108 in a conversation 304 comprising the message 108 that the attachment 110 is attached to is displayed in the messaging application UI 140, and a selection of the message 108 or another message 108 in the conversation 304 is received. For example and with reference to FIG. 3, an example messaging application UI 302 is shown. In the illustrated example, the messaging application 122 is an email application. In the messaging application UI 302, a listing of email messages 108 are provided. As illustrated, the user 116 has selected a message 108 in the list, and a preview of the message 108 and of other messages 108 that are part of a conversation 304 is displayed in a preview or reading pane 306 in the messaging application UI 302. Further as illustrated, the user 116 is selecting an attachment 110 in the conversation 304 displayed in a messaging application UI 302.

With reference again to FIG. 2, the method 200 continues to OPERATION 208, where responsive to the selection, various parameters associated with the associated message(s) 108 are extracted. According to an aspect, message identification information is an extracted parameter. Further, an API call is made to the message server 106 to extract server communication network path reference information and context information.

At OPERATION 210, a new protocol network path reference (e.g., protocol URL) including the context information (e.g., a conversation identifier) is created and passed to the productivity application 104. At OPERATION 212, the protocol network path reference is passed to the productivity application 104, which the productivity application 104 is enabled to use to retrieve the associated message(s) 108 for display in a communications panel 142 in the productivity application UI 140. In some examples, the protocol handler 126 receives the protocol network path reference via an execution API, extracts out parameters, and constructs an execution command line with command line flags based on the protocol network path reference. The protocol handler 126 further makes a call to the Shell to start the productivity application 104 or hands the command line to the associated application.

Figure 4A:
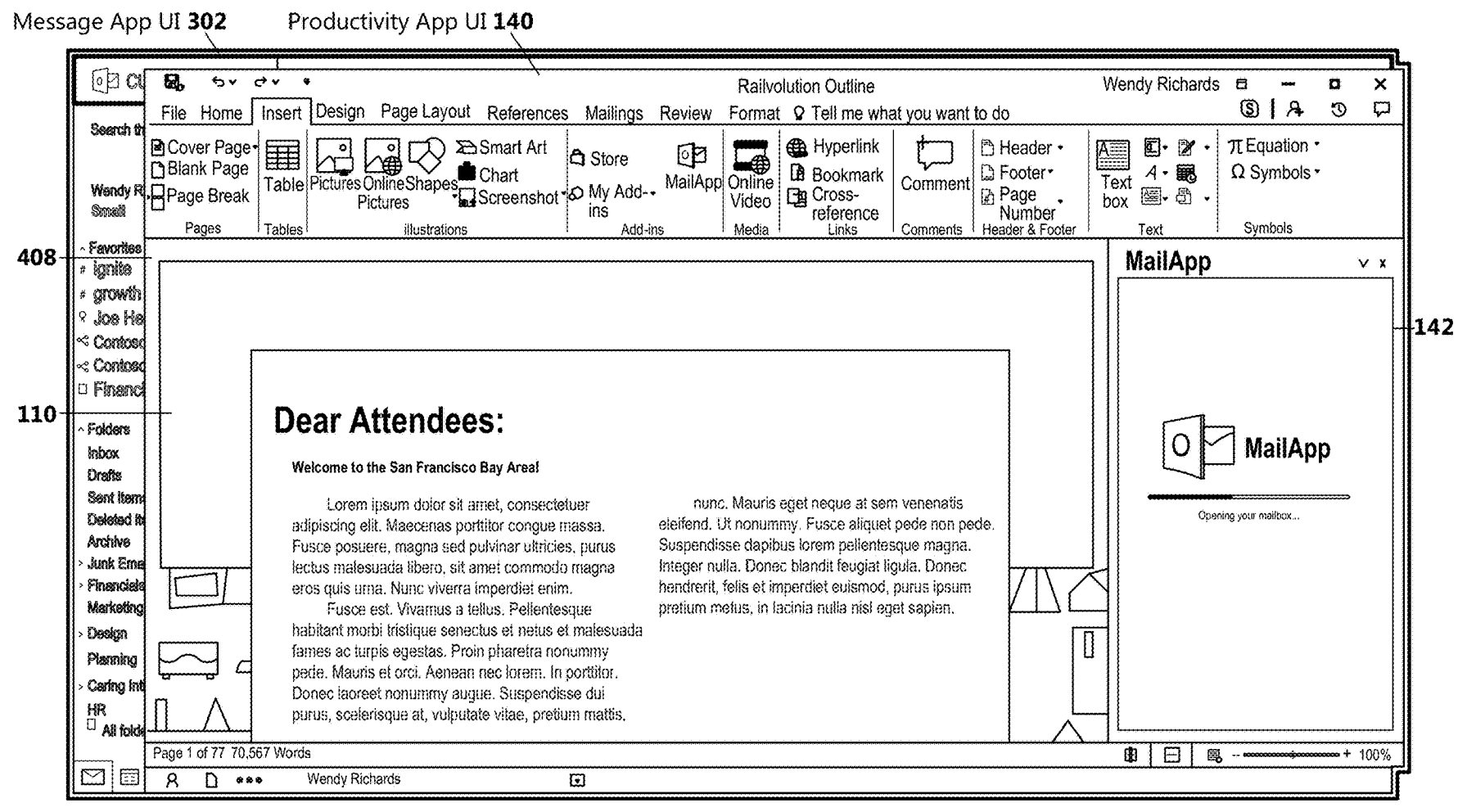

With reference to FIG. 4A, the productivity application 104 is launched. The productivity application 104 extracts conversation ID context passed to the application, and stores the context in association with the attachment 110. For example, the attachment 110 is opened and displayed in a content display region 408 of the productivity application UI 140. The productivity application 104 checks for associated context, and using the protocol network path reference and context, establishes a communication to the message server 106 where the message(s) 108 reside. As illustrated, the communications panel 142 is automatically opened.

Figure 4B:
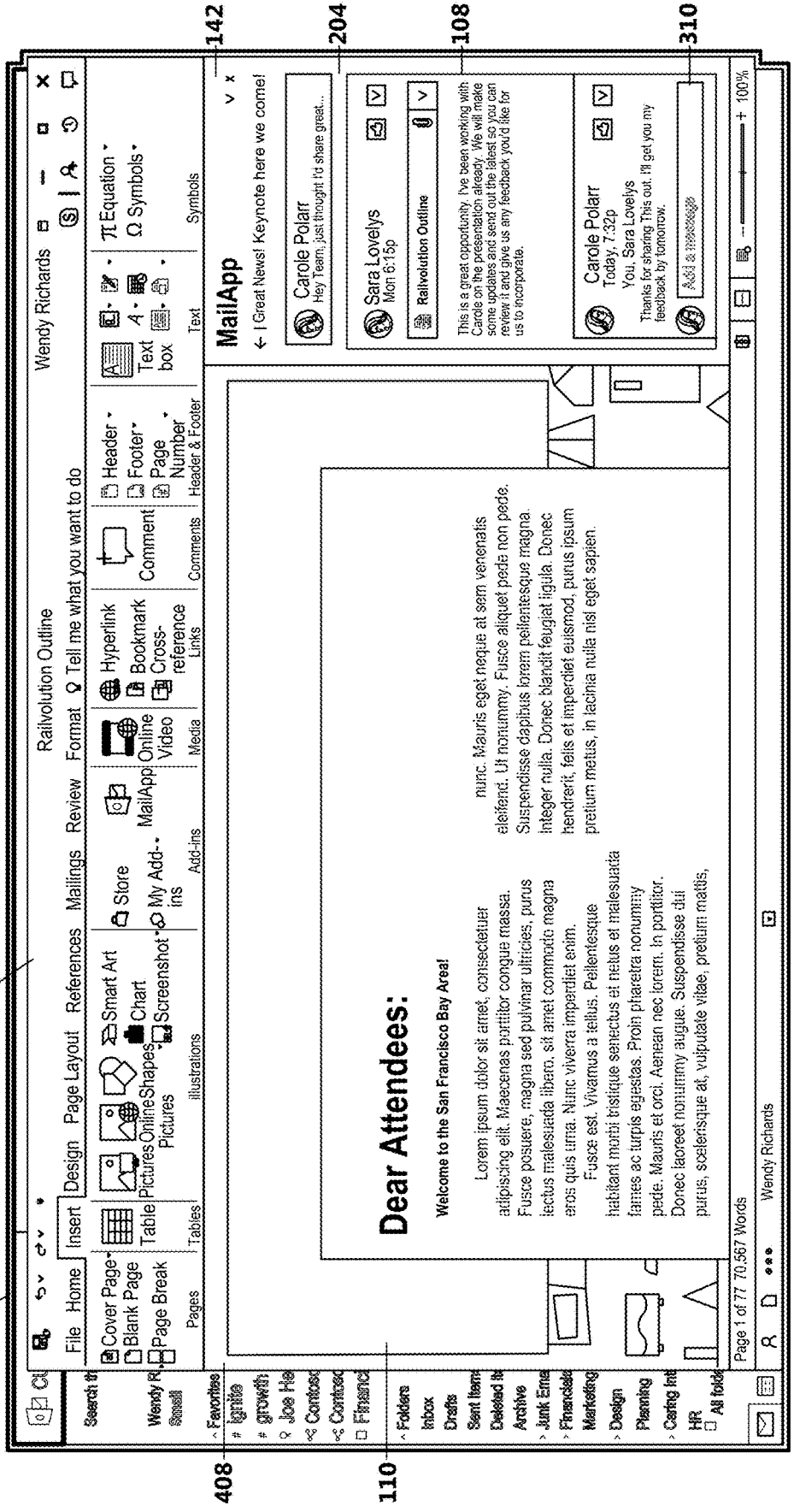
FIG. 4B illustrates the example productivity application UI showing an associated conversation persisted in a communications panel in the productivity application UI.

With reference now to FIG. 4B, data are obtained from the message server 106, and a functional optimized messaging application user experience is loaded into the communications panel 142. For example, the message conversation 304 is retrieved from the server 106 and rendered in the communications panel 142. As illustrated, at least a limited set of messaging application functionalities 310 are provided, such as a functionality command for adding a message 108 to the displayed conversation 304. According to an aspect, the message(s) 108 or conversation continue to persist in the communications panel 142 as the user 116 interacts with the attachment 110. The method 200 ends at OPERATION 298.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
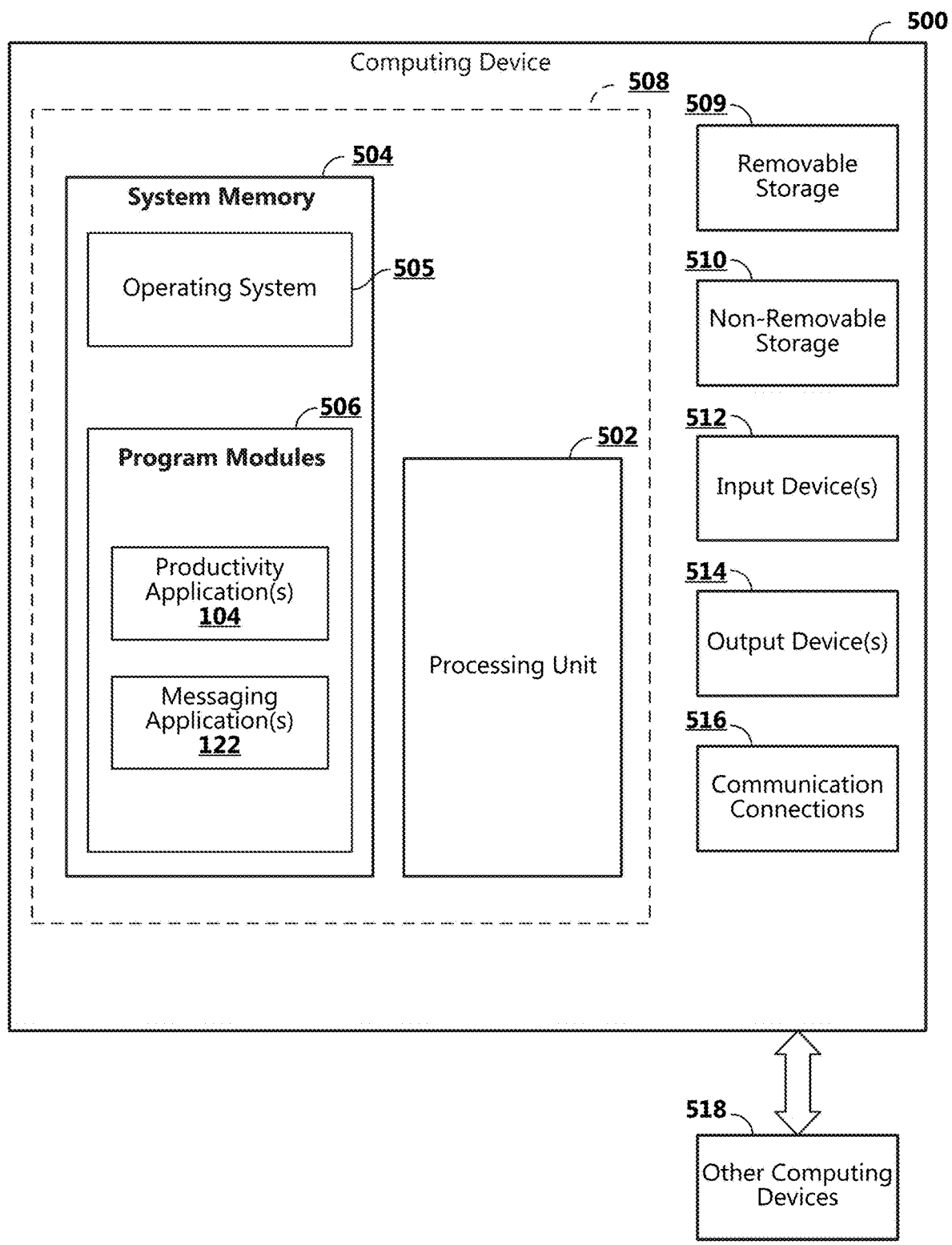
FIG. 5 is a block diagram illustrating example physical components of a computing device.
Figure 6A:
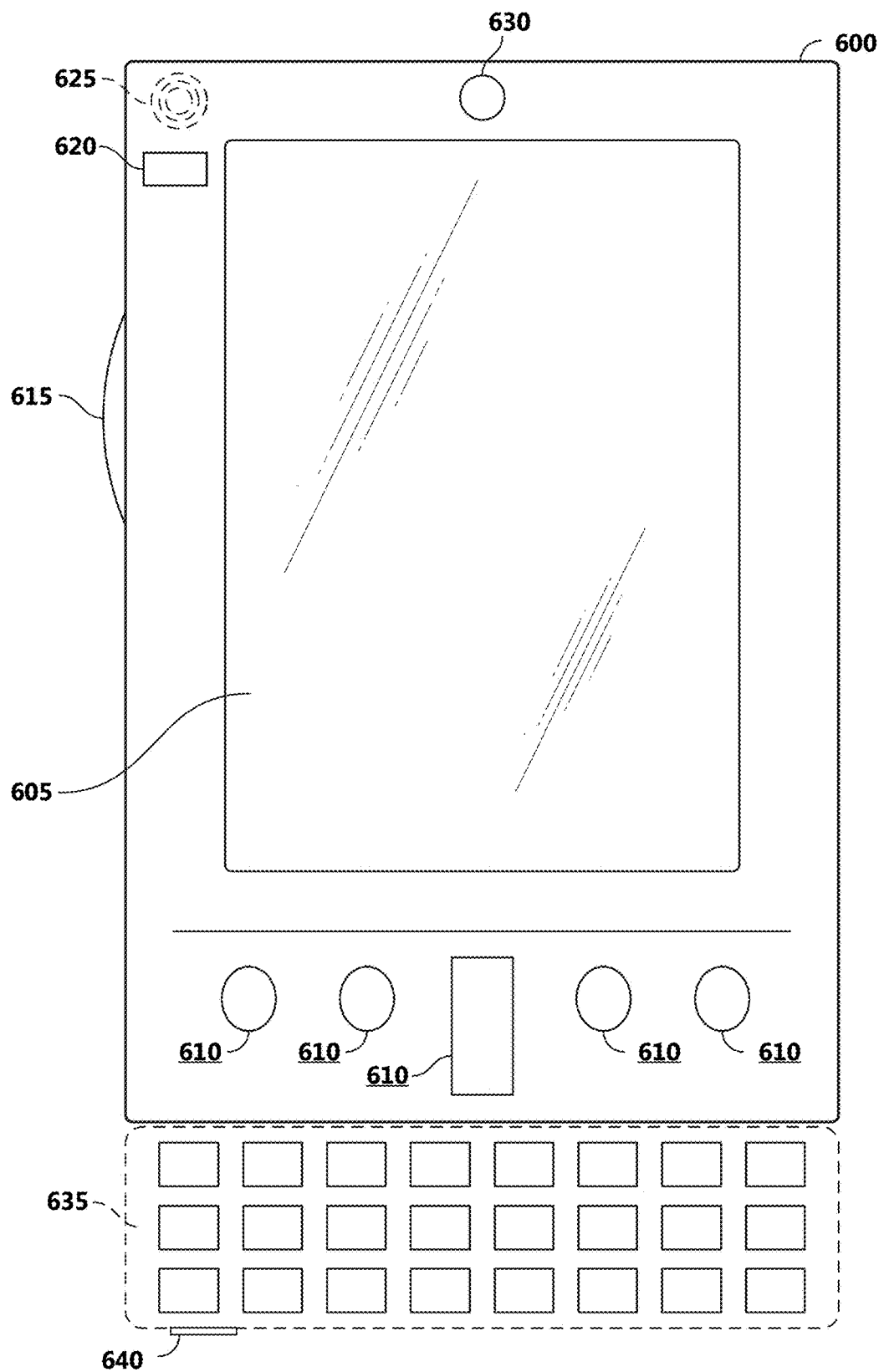
FIGS. 6A and 6B are block diagrams of a mobile computing device.
Figure 6B:
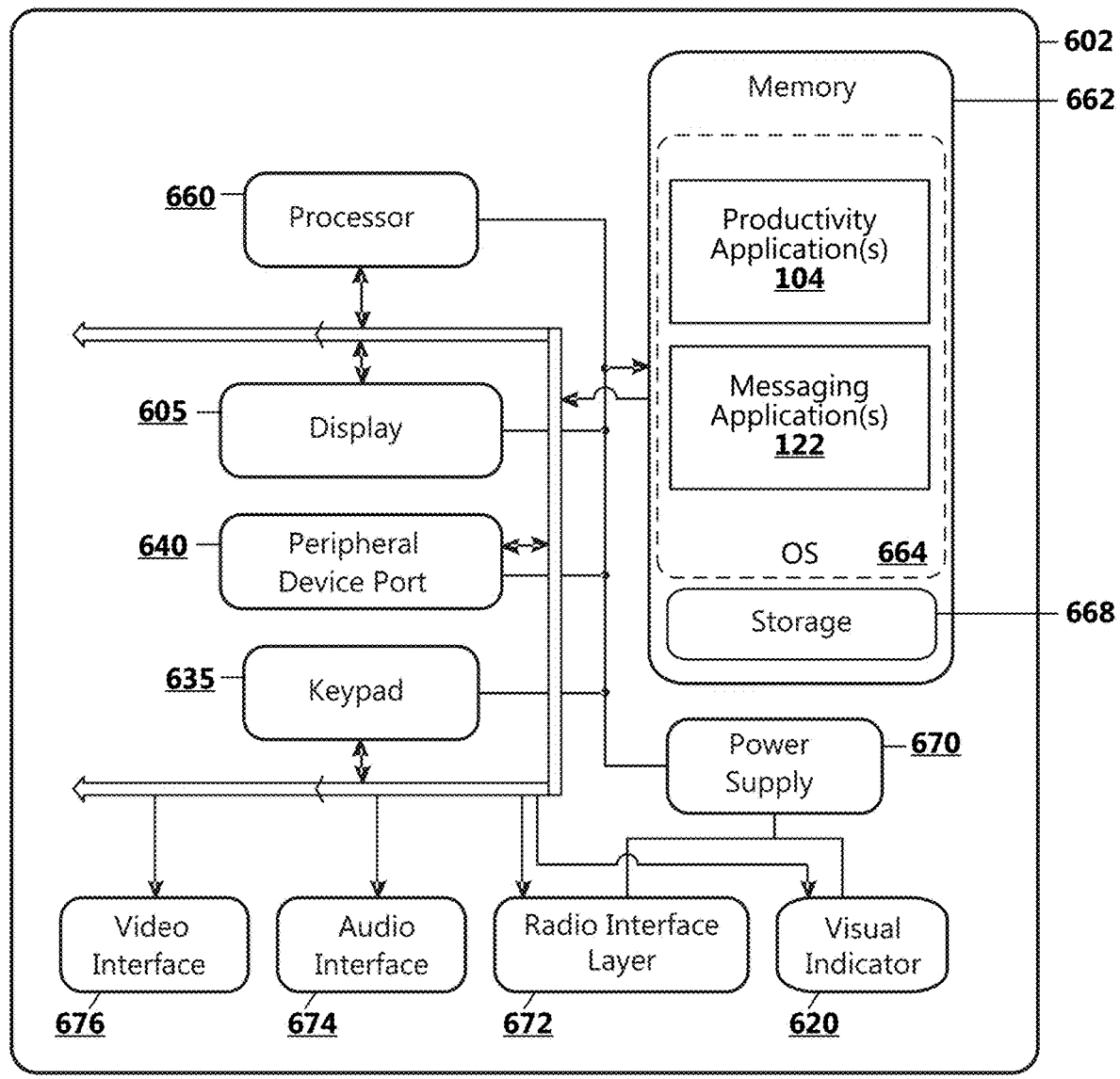
Figure 7:
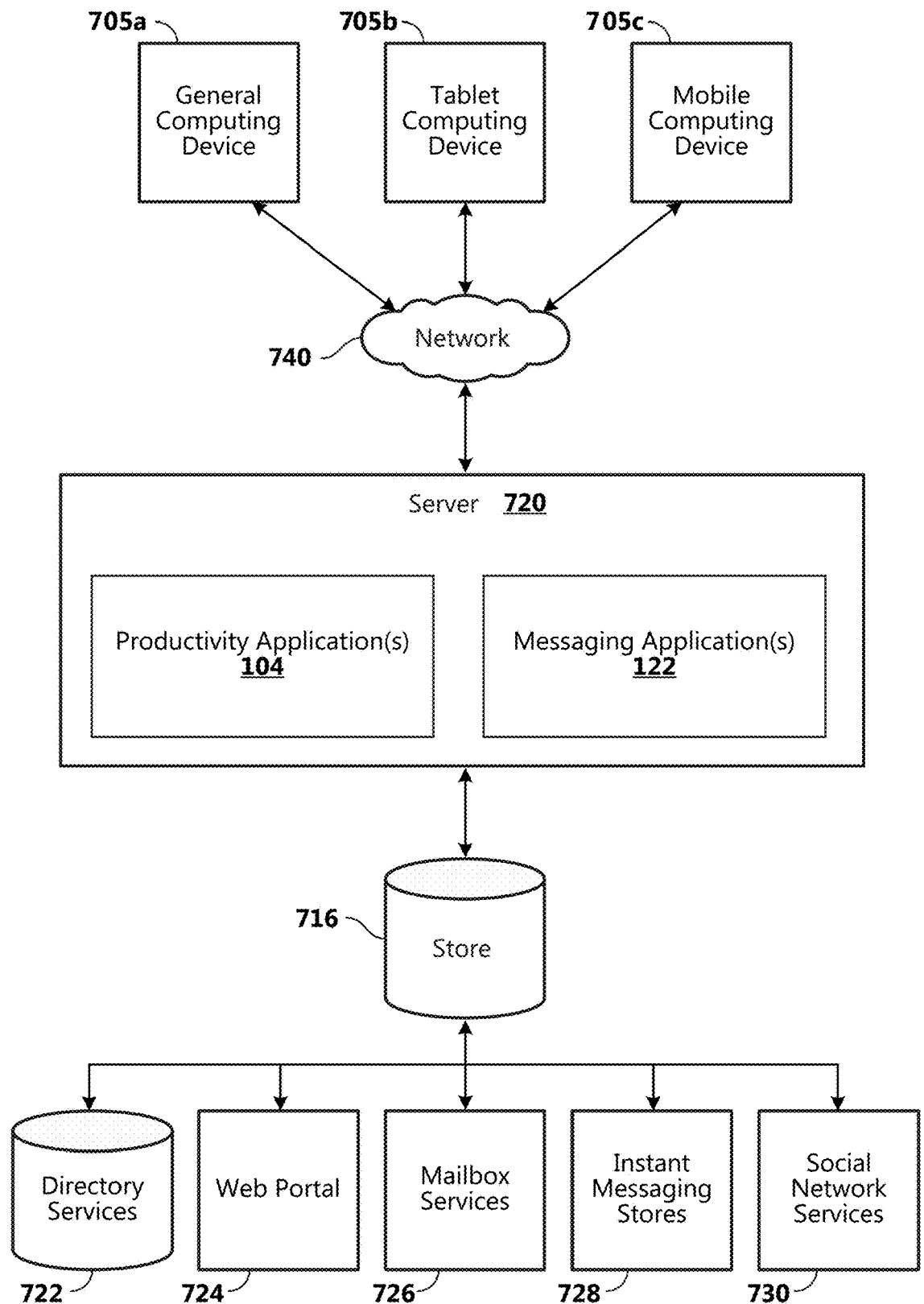
FIG. 7 is a block diagram of a distributed computing system.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are utilized for practicing aspects, described herein.

FIG. 5 is a block diagram illustrating physical components (i.e., hardware) of a computing device 500 with which examples of the present disclosure are be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications. According to an aspect, the system memory 504 includes a messaging application 122 and a productivity application 104. The operating system 505, for example, is suitable for controlling the operation of the computing device 500. Furthermore, aspects are practiced in conjunction with a graphics library, other operating systems, or any other application program, and are not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., a messaging application 122, a file finder application 128, and a productivity application 104) perform processes including, but not limited to, one or more of the stages of the method 200 illustrated in FIG. 2. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 5 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 500 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or less input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, a messaging application 122 and a productivity application 104 are loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 is stored locally on the mobile computing device 600, as described above. According to another aspect, the data is stored on any number of storage media that is accessible by the device via the radio 672 or via a wired connection between the mobile computing device 600 and a separate computing device associated with the mobile computing device 600, for example, a server computer in a distributed computing network, such as the Internet. As should be appreciated such data/information is accessible via the mobile computing device 600 via the radio 672 or via a distributed computing network. Similarly, according to an aspect, such data/information is readily transferred between computing devices for storage and use according to well-known data/information transfer and storage means, including electronic mail and collaborative data/information sharing systems.

FIG. 7 illustrates one example of the architecture of a system for providing message identification information to a productivity application 104 as described above. Content developed, interacted with, or edited in association with a messaging application 122 or a productivity application 104 is enabled to be stored in different communication channels or other storage types. For example, various documents may be stored using a directory service 722, a web portal 724, a mailbox service 726, an instant messaging store 728, or a social networking site 730. The a messaging application 122 or productivity application 104 are operative to use any of these types of systems or the like for providing message identification information, as described herein. According to an aspect, a server 720 provides a messaging application 122 or a productivity application 104 to clients 705a,b,c. As one example, the server 720 is a web server providing a messaging application 122 or a productivity application 104 over the web. The server 720 provides a messaging application 122 or a productivity application 104 over the web to clients 705 through a network 710. By way of example, the client computing device is implemented and embodied in a personal computer 705a, a tablet computing device 705b or a mobile computing device 705c (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computer-implemented method for enabling an embedded communication experience in a productivity application in association with an attachment file, comprising:
   receiving, at a messaging application, a message comprising the attachment file;
   receiving, at the messaging application, a selection of the attachment file;
   extracting, by the messaging application, message identification parameters;
   constructing, by the messaging application, a protocol network path reference including the extracted message identification parameters; and
   passing the protocol network path reference from the messaging application to the productivity application as the attachment file is being opened in the productivity application in response to the selection, wherein:
      the attachment file is automatically opened and displayed in a content display region of a user interface of the productivity application;
      a communications pane is automatically opened and displayed in the user interface of the productivity application;
      a user experience of the messaging application is loaded in the communications pane; and
      the message is retrieved from the messaging application using the protocol network path reference and displayed in the communications pane in accordance with the user experience of the messaging application.

2. The method of claim 1, wherein extracting the message identification parameters comprises making an application programming interface call to a message server to extract communication base functionality.

3. The method of claim 2, wherein extracting the message identification parameters further comprises extracting context information.

4. The method of claim 3, wherein extracting the context information comprises:
   generating a conversation identifier from a local message identifier; and
   extracting identity information for communication to the message server.

5. The method of claim 4, wherein constructing the protocol network path reference comprises constructing a Uniform Resource Locator including the extracted message identification parameters.

6. The method of claim 1, wherein passing the protocol network path reference from the messaging application to the productivity application comprises sending the protocol network path reference through a shell application programming interface for parsing of the protocol network path reference and construction of a shell execution command line comprising command line flags based on the message identification parameters by a protocol handler.

7. The method of claim 6, wherein passing the protocol network path reference from the messaging application to the productivity application comprises passing the protocol network path reference to the productivity application via the protocol handler.

8. The method of claim 6, further comprising:
   in response to receiving the selection of the attachment file, making a call to the shell application programming interface to one or more of launch the productivity application and open the attachment file in the productivity application.

9. The method of claim 8, further comprising:
   passing the shell execution command line to the productivity application.

10. The method of claim 1, wherein passing the protocol network path reference from the messaging application to the productivity application comprises passing the protocol network path reference to the productivity application for allowing the message and other messages in a conversation to be retrieved and displayed in the communications pane of the user interface of the productivity application.

11. A system for enabling an embedded communication experience in a productivity application in association with an attachment file, the system comprising a computing device, the computing device comprising:
   at least one processing device; and
   at least one computer readable data storage device storing instructions that, when executed by the at least one processing device, enable the computing device to:
      responsive to receiving, at a messaging application, a selection of the attachment file associated with a message:
         extract, by the messaging application, message identification parameters;
         construct, by the messaging application, a protocol network path reference including the extracted message identification parameters; and
         pass the protocol network path reference from the messaging application to the productivity application as the attachment file is being opened in the productivity application in response to the selection, wherein:
            the attachment file is automatically opened and displayed in a content display region of a user interface of the productivity application;
            a communications pane is automatically opened and displayed in the user interface of the productivity application;
            a user experience of the messaging application is loaded in the communications pane; and
            the message is retrieved from the messaging application using the protocol network path reference and displayed in the communications pane in accordance with the user experience of the messaging application.

12. The system of claim 11, wherein in constructing the protocol network path reference, the system is operative to construct a Uniform Resource Locator including the extracted message identification parameters.

13. The system of claim 12, wherein in extracting the message identification parameters, the system is operative to make an application programming interface call to a message server to extract communication base functionality.

14. The system of claim 13, wherein in extracting the message identification parameters, the system is further operative to extract context information.

15. The system of claim 14, wherein in extracting the context information, the system is operative to:
   generate a conversation identifier from a local message identifier; and
   extract identity information for communication to the message server.

16. The system of claim 15, wherein in constructing the Uniform Resource Locator, the system is operative to combine a base Uniform Resource Locator, query string parameters, and the context information.

17. The system of claim 11, wherein in passing the protocol network path reference from the messaging application to the productivity application, the system is operative to:
- send the protocol network path reference through a shell application programming interface for parsing of the protocol network path reference and construction of a shell execution command line comprising command line flags based on the message identification parameters by a protocol handler; and
- send the protocol network path reference to the productivity application via the protocol handler.

18. The system of claim 11, wherein in passing the protocol network path reference to the productivity application, the system is operative to pass the protocol network path reference to the productivity application for allowing the message and other messages in a conversation to be retrieved and displayed in the communications pane of the user interface of the productivity application.

19. A computer storage medium including computer readable instructions, which when executed by a processing unit is operative to:
- receive, at a messaging application, a message comprising an attachment file;
- receive, at the messaging application, a selection of the attachment file;
- make, by the messaging application, an application programming interface call to a message server to extract communication base functionality and context information;
- construct, by the messaging application, a Uniform Resource Locator including the extracted communication base functionality and the context information; and
- pass the Uniform Resource Locator from the messaging application to a productivity application as the attachment file is being opened in the productivity application in response to the selection, wherein:
  - the attachment file is automatically opened and displayed in a content display region of a user interface of the productivity application;
  - a communications pane is automatically opened and displayed in the user interface of the productivity application;
  - a user experience of the messaging application is loaded in the communications pane; and
  - the message is retrieved from the messaging application using the Uniform Resource Locator and displayed in the communications pane in accordance with the user experience of the messaging application.

20. The computer storage medium of claim 19, wherein in passing the Uniform Resource Locator from the messaging application to the productivity application, the processing unit is operative to:
- send the Uniform Resource Locator through a shell application programming interface to a protocol handler for parsing of the Uniform Resource Locator and construction of a shell execution command line comprising command line flags based on the extracted communication base functionality and the context information; and
- send the Uniform Resource Locator to the productivity application via the protocol handler.

\* \* \* \* \*